Figure 1:
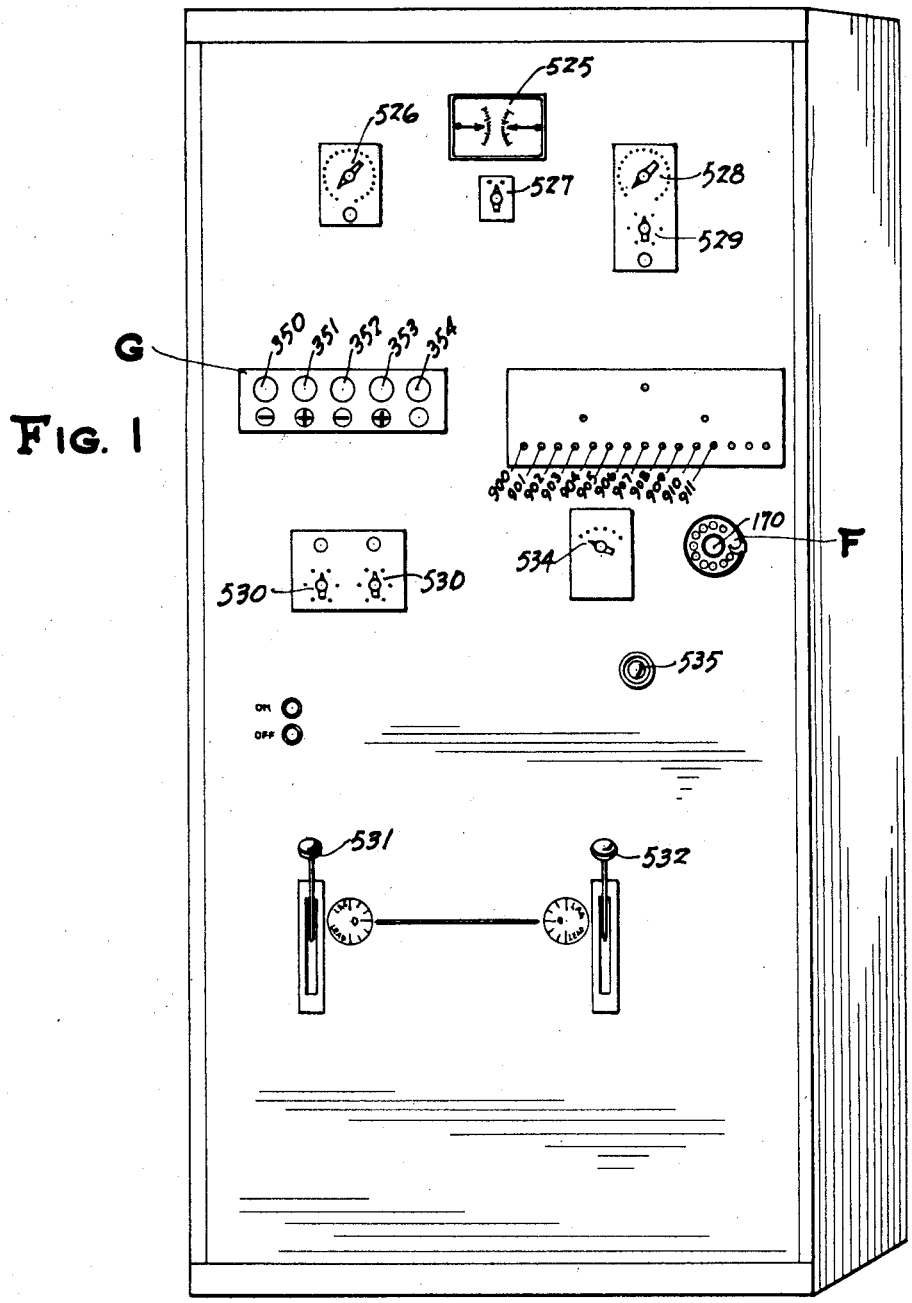

Jan. 17, 1939. J. J. ROOT 2,144,033
ELECTRICAL TIMING CONTROL
Filed Feb. 11, 1937 8 Sheets-Sheet 5

INVENTOR
John J. Root
BY
ATTORNEY

INVENTOR.
JOHN J. ROOT
BY A. E. Wilson
ATTORNEY.

Jan. 17, 1939.   J. J. ROOT   2,144,033
ELECTRICAL TIMING CONTROL
Filed Feb. 11, 1937    8 Sheets—Sheet 8
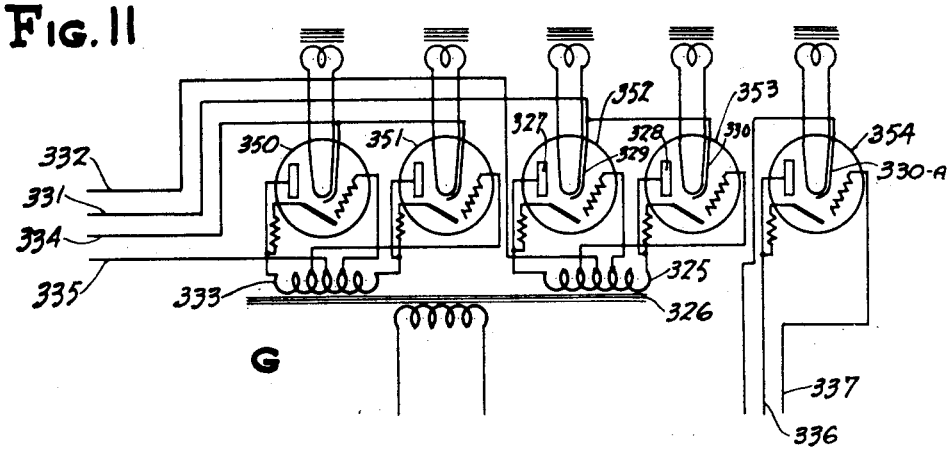
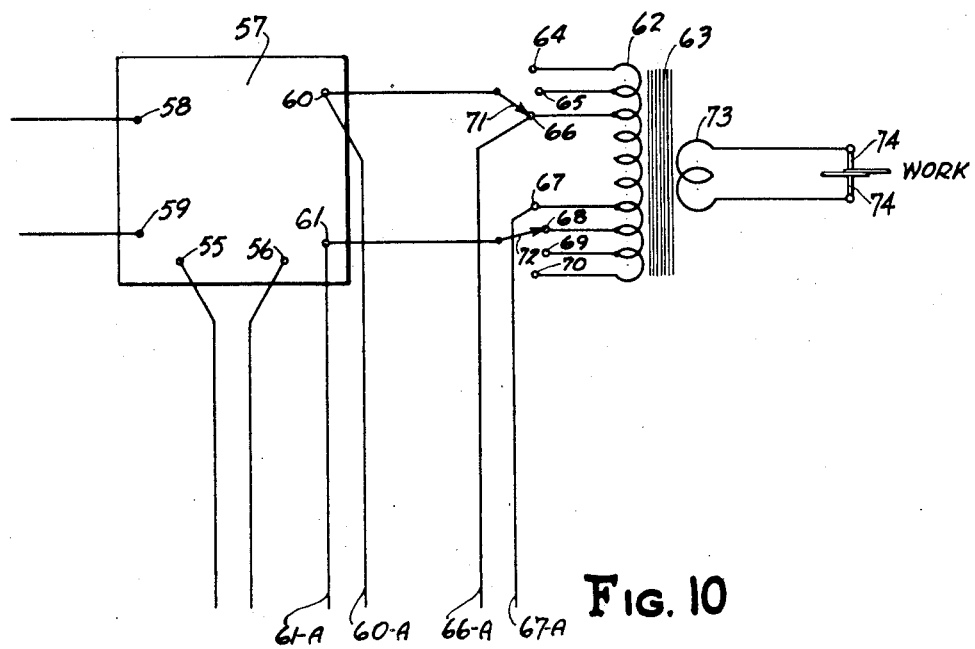
INVENTOR.
JOHN J. ROOT
BY A. E. Wilson
ATTORNEY.

//Patented Jan. 17, 1939

2,144,033

UNITED STATES PATENT OFFICE 2,144,033

ELECTRICAL TIMING CONTROL

John J. Root, South Bend, Ind., assignor to Bendix Products Corporation, South Bend, Ind., a corporation of Indiana Application February 11, 1937, Serial No. 125,248

37 Claims. (Cl. 171—97)

This invention relates to an electric timing device, and more particularly to a timing device which employs the voltage wave form of an alternating electric current as a measure of time. The device is especially adapted for controlling the flow of welding current in a spot welding machine, but the device may be used for other purposes and in other connections.

An object of the invention is to provide an electric timer in which the speed of rotation of a synchronous motor is employed to time an electric signal, and which is effective for marking very short signals with great accuracy.

Another object is to provide an electric timer capable of emitting automatically a series of timed signals, the length of each of the signals in the series being variable at the wish of an operator.

Another object is to provide an electric timer by which an electrical impulse may be started and stopped at any desired points on the voltage wave form of an alternating current.

A further object is to provide an electrical timer which will indicate to an operator the polarity and phase of the alternating current used, to measure the length of timing signals at the time the signals are initiated, and which will indicate also the length of the signals emitted.

Still another object is to provide an electrical timer which may be adjusted to operate at each of different settings on auxiliary equipment such as the settings on a welding transformer, and which will not operate to emit signals except at the setting adjusted for. Other objects will appear as the specification proceeds.

Developments in several fields of industry and especially in the field of electric spot welding have created a demand for a control device which will initiate and time an operation which takes place in a small fractional part of a second. For instance, where it is desired to produce a number of spot welds in making an article of manufacture it is necessary to have some kind of timing device which will control the time at which the welding current is started and the time that it is stopped. Other applications also have added to the need for an improved timing control.

In response to this demand several different kinds of timing control devices have been developed. Among these is the mechanically operated timer in which a pedal or lever is depressed to start the electrical impulse and then returned to its original position to stop the impulse. Such a device has been found impractical because an operator can not act quickly enough to release the pedal within the short time required. Cam operated devices have also been used but these soon wear and become inaccurate and at best are not suitable for very short timing periods.

Also there are various types of control devices employing vacuum tubes and operating upon the principle of interruption of the flow of electrons. So far as I am aware, in all of these devices the underlying principle is the interval of time required either to charge or discharge a condenser. Though attended with some measure of success these devices are limited in their application and are not flexible of control, and they have not solved the problem of how to initiate and terminate the electrical impulse at any desired point on the voltage wave.

In my improved control device I employ a circuit which includes a tube having a "lock-in" characteristic; that is, once a voltage is impressed upon the grid of the tube plate current will flow through the tube as long as there is plate voltage. To supply the charge necessary to start the flow of current through the circuit mentioned I employ an arrangement of condensers and contacts on a commutator driven by a synchronous motor. And to stop the flow of current through this circuit I employ contacts on the commutator which, when made, operate to interrupt current flow through a second tube arranged in series with the "lock-in" tube. I am able to start the signal current at any desired point on the voltage wave and likewise stop the signal current at any desired point on the voltage wave. This and other features will appear more clearly after the following detailed description:

One embodiment of my invention is illustrated by the accompanying drawings in which —

Figure 2:
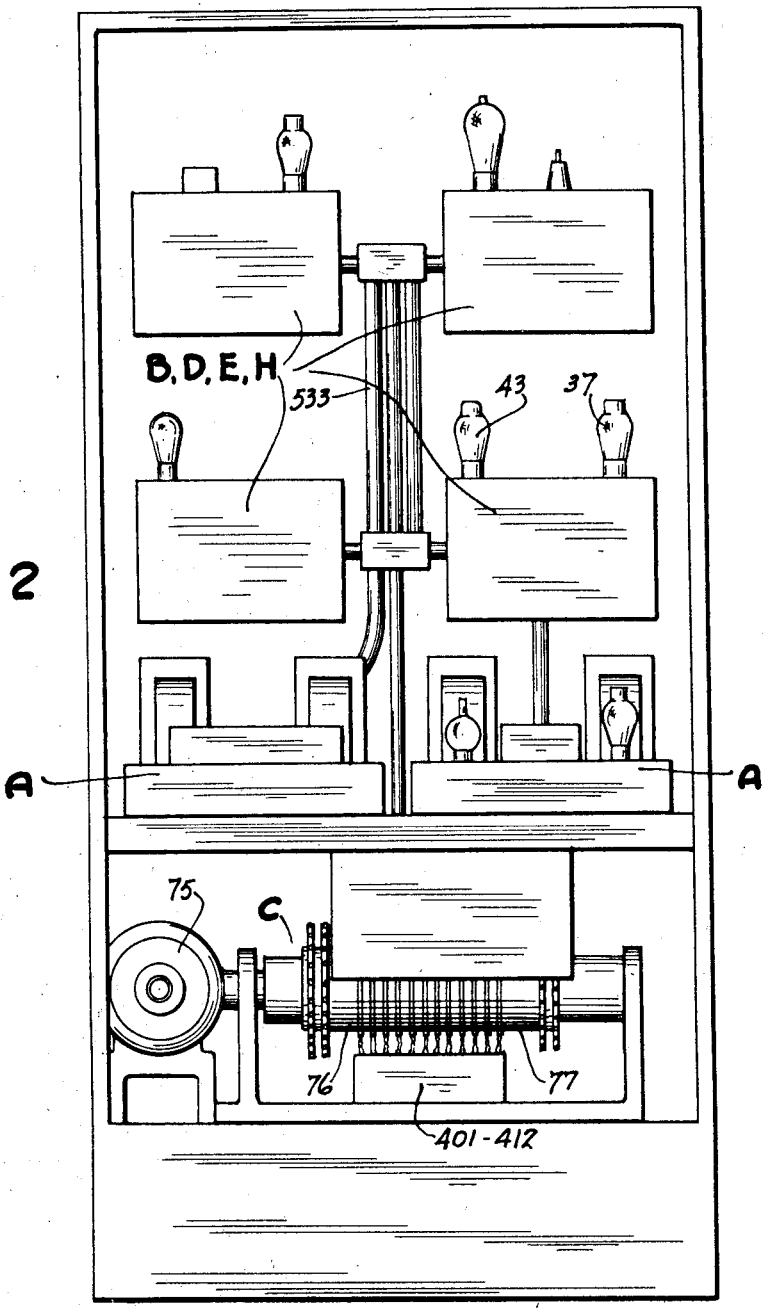
Figure 3:
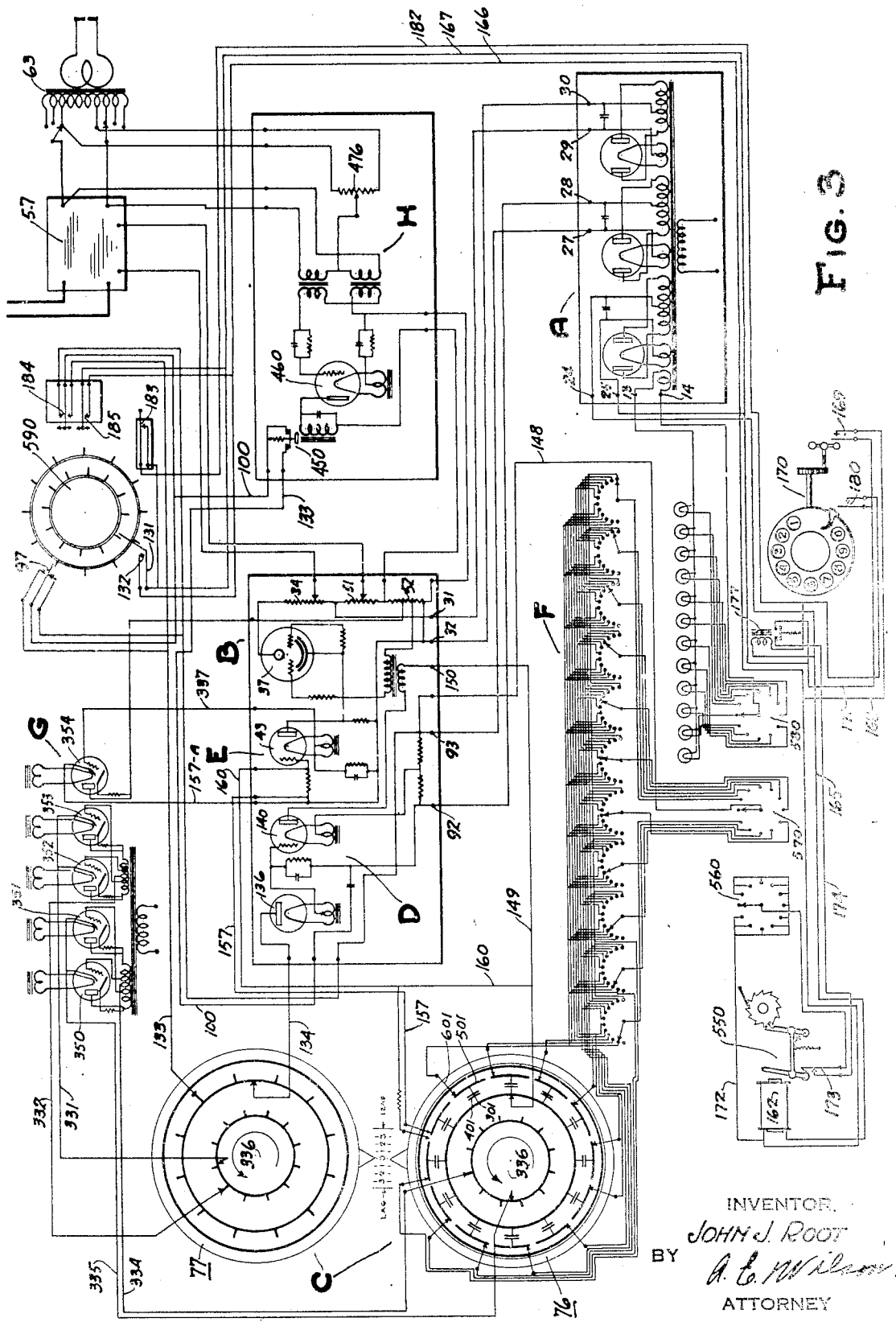
Figure 4:
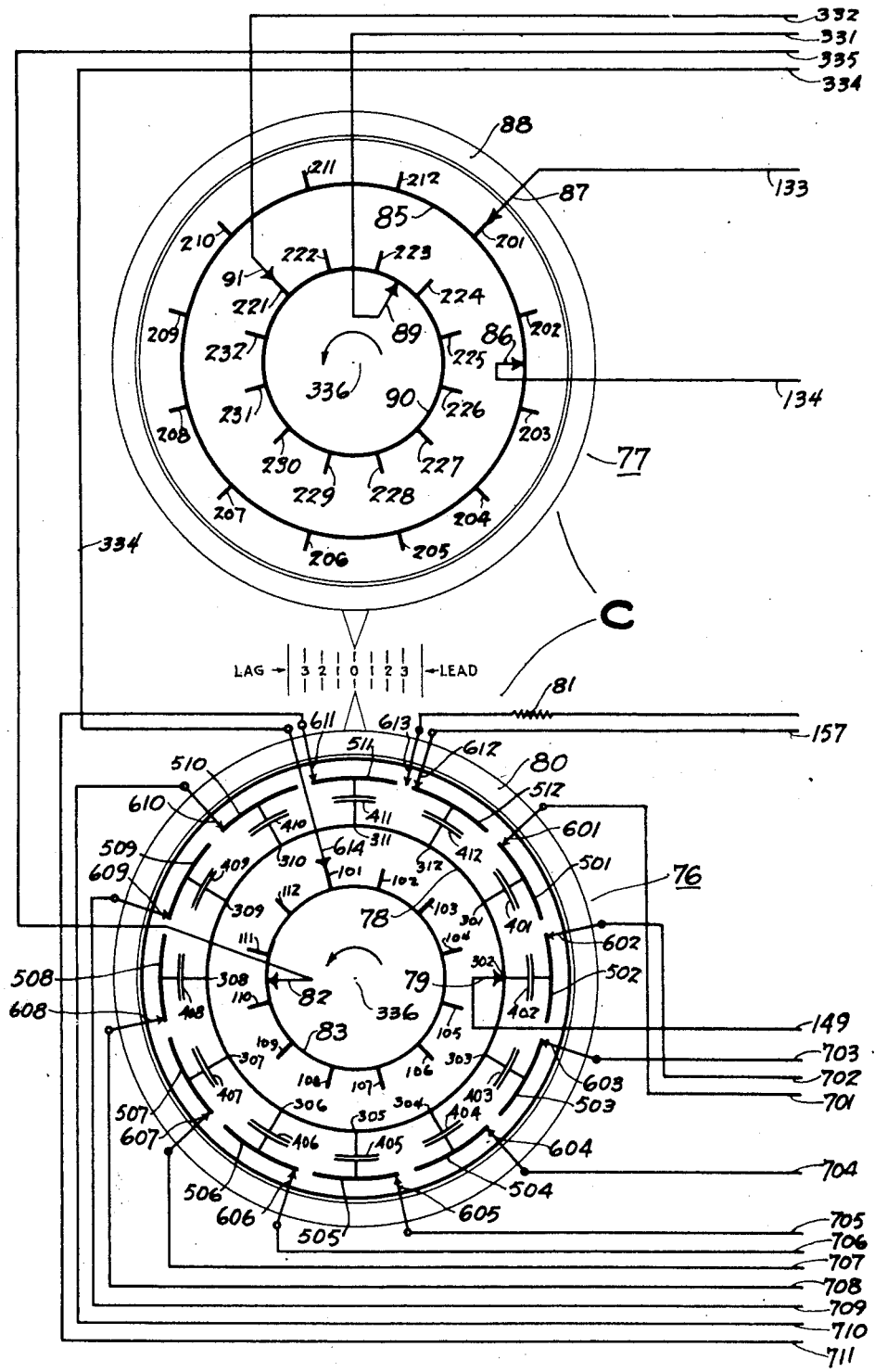
Figure 5:
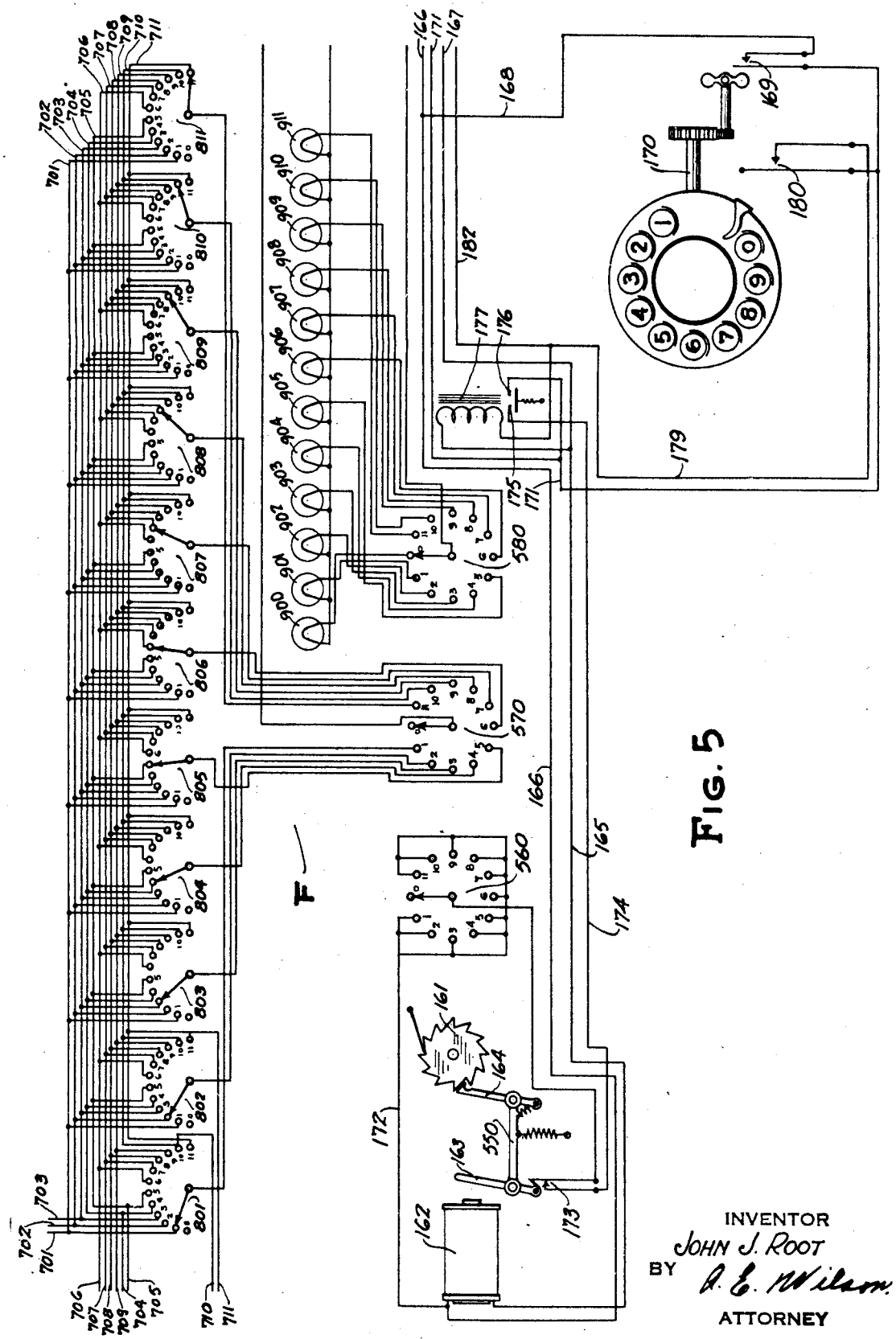
Figure 6:
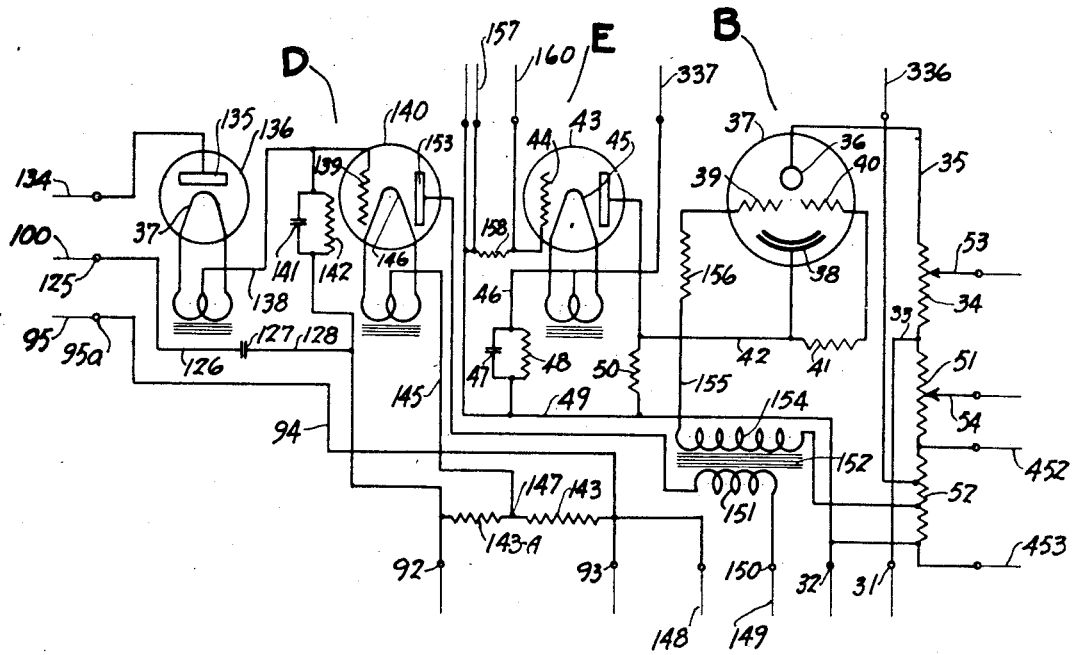
Figure 9:
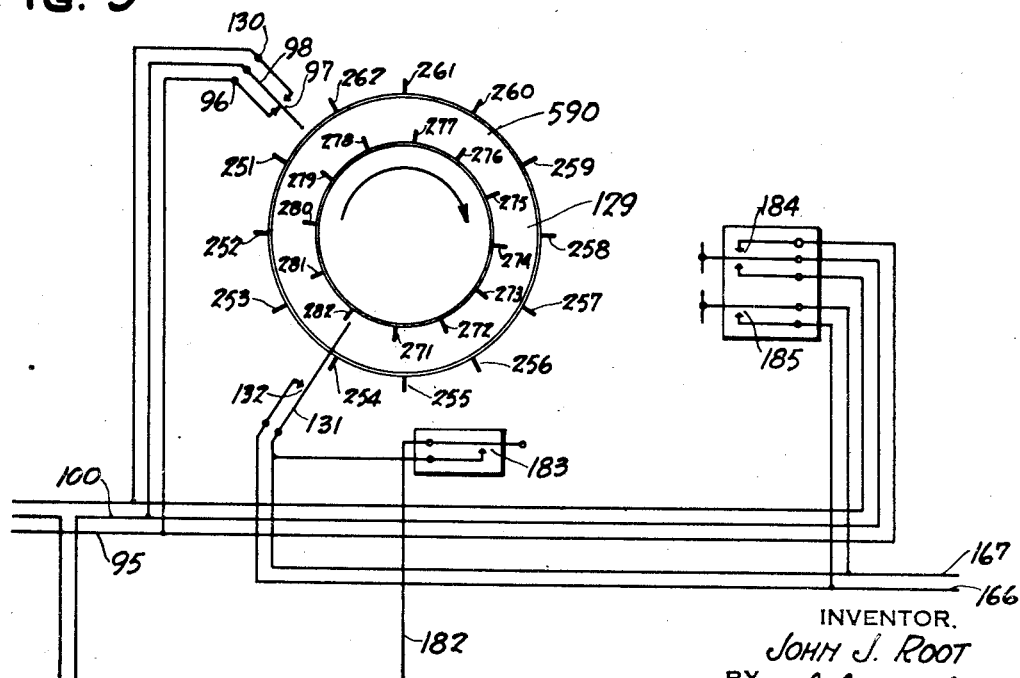
Figure 8:
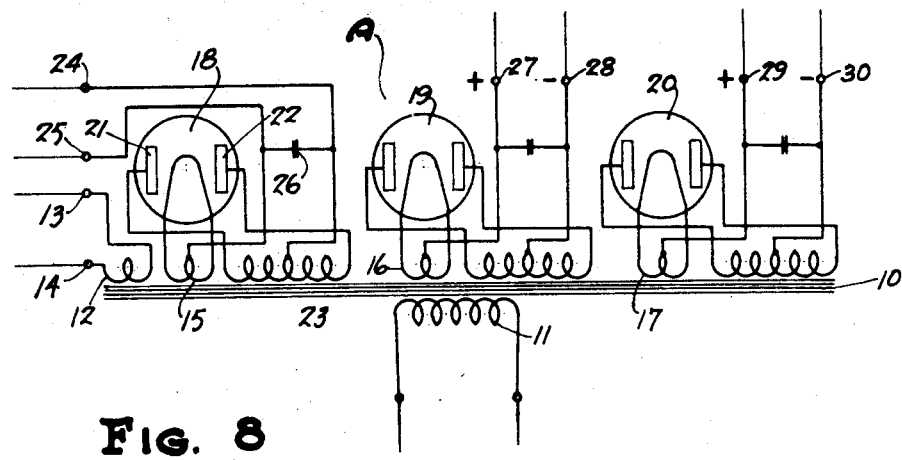
Figure 7:
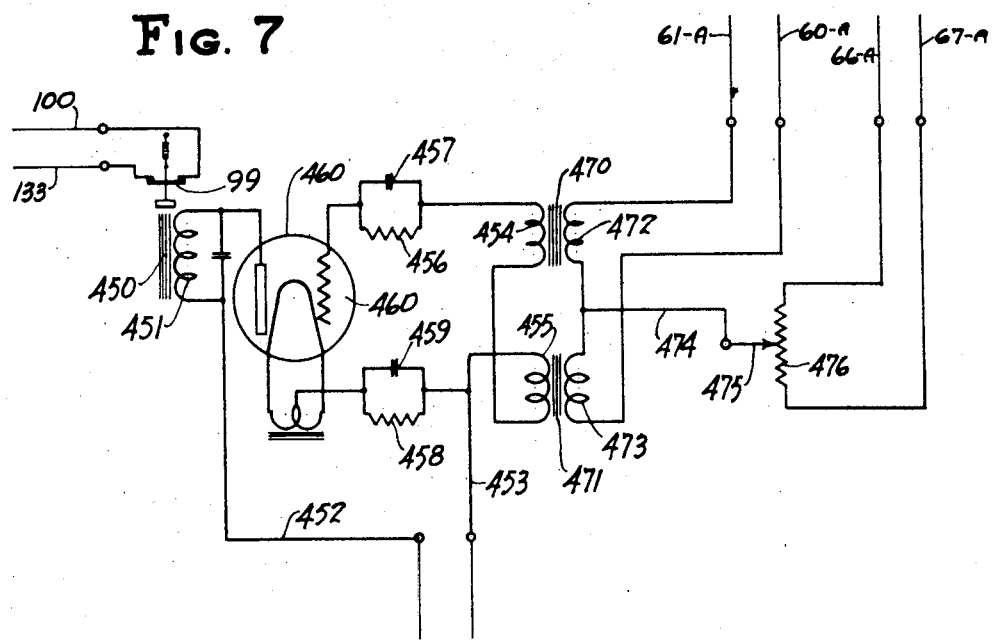

Fig. 1 is a perspective view of a box in which necessary apparatus may be mounted, the front side here shown being the operator's control panel; Fig. 2, a view of the rear side of the box shown in Fig. 1, and showing the apparatus mounted therein; Fig. 3, a complete schematic diagram of the whole device; Fig. 4, an enlarged view showing the commutator contacts and points of connection; Fig. 5, an enlarged view showing diagrammatically the selector system; Fig. 6, an enlarged view showing diagrammatically the main control circuit and a part of the means which effects its operation; Fig. 7, an enlarged view showing diagrammatically the bridge circuit for preventing timing signals except at predetermined settings of auxiliary equipment; Fig. 8, an enlarged diagrammatic view of the power supply unit; Fig. 9, an enlarged schematic view of a rotary switch; Fig. 10, a schematic view of a welding transformer and welding current switch; and Fig. 11, a schematic view of the indicating means.

As illustrated, A designates a source of power supply; B, the main control circuit which may be called the "lock-in" circuit; C, a synchronous motor and commutators; D, means for initiating current flow in the main control circuit; E, means for terminating current flow in the main control circuit; F, a selector system for selecting the length of signal desired; G, indicating means; and H, a bridge circuit controlling the emission of signals.

The power supply A may consist of any suitable source of electrical energy. As illustrated it comprises a transformer 10, the primary side 11 being connected to any source such as an ordinary 110 volt line. A secondary winding 12 creates a potential between posts 13 and 14, and secondary windings 15, 16 and 17 light the filaments of tubes 18, 19 and 20, respectively. It is understood also that the voltage for lighting the filaments of other tubes may also be obtained from transformer 10 though for convenience in the schematic drawings this is not specifically indicated. Tube 18 has plates 21 and 22 which are connected, respectively, to opposite ends of transformer winding 23. A direct current potential is built up between post 24, which is connected to the mid point of winding 23, and post 25 which is connected to the mid point of winding 15. Current being considered as flowing from plate to filament, the post 25 is of positive potential and post 24 of negative potential. A condenser 26 connected between posts 24 and 25 acts as a filter. Each of tubes 19 and 20 are connected in similar manner as tube 18, posts 27 and 29 being of positive potential, and posts 28 and 30 of negative potential. It is understood that batteries of any other source of electrical supply may be used in place of the above described power pack when so desired.

The main control circuit B may be more clearly seen by reference to Fig. 6 of the drawings. Posts 31 and 32 are connected, respectively, to posts 29 and 30 of the power supply. Conductor 33 connects post 31 with one end of potentiometer winding 34, and conductor 35 connects the other end of potentiometer winding 34 with the anode 36 of the "lock-in" tube 37 which may be a type of grid glow tube. The characteristics of tube 37 are such that no current may pass between its anode 36 and cathode 38 until a positive voltage is impressed on its grid 39, but once grid 39 is made positive and current starts to flow between anode and cathode, subsequent changes in grid potential do not affect this current and there is no interruption of current flow so long as there remains a voltage impressed on its anode. It is equipped with a suppressor grid 40 which is connected through suppression resistance 41 to the cathode 38.

Conductor 42 leads from the cathode of tube 37 to the plate of thermionic tube 43 having a grid 44. The filament 45 of tube 43 is connected by conductor 46 to condenser 47 and resistance 48 arranged in parallel to form an automatic C bias for tube 43. Conductor 49 connecting the bias circuit with post 32 completes the power supply of rectifier tube 20. A resistance 50 of high value is bridged between conductors 42 and 49 and is for the purpose of obtaining proper balance between the two tubes 37 and 43.

Assuming that the tubes 37 and 43 are in condition to allow plate current to pass, it is seen that a current will flow from post 31 through potentiometer 34, from anode to cathode of tube 37, from plate to filament of tube 43, and return to post 32. It must be remembered that tubes 37 and 43 are connected in series so that the instant tube 43 ceases to pass plate current, current through potentiometer 34 and through tube 37 will be cut off.

Conductor 33 connects also with one end of potentiometer winding 51, the other end of winding 51 being connected through resistance 52 to post 32, winding 51 and resistance 52 serving as a voltage divider. Variable contact 53 on winding 34, and variable contact 54 on winding 51 are connected, respectively, to the terminals where the timed signals are to be utilized.

As shown in Fig. 10 the conductors leading from contacts 53 and 54 and carrying the output of the control circuit may be connected to the terminals 55 and 56 of a welding switch 57 of any suitable type such as the well known magnetic or tube type welding switches. The potential at terminals 55 and 56 must be such that when no current is flowing through the main control circuit the switch will remain open, and when current begins to flow through the control circuit the switch will close the circuit between line terminals 58 and 59 and posts 60 and 61. Posts 60 and 61 are connected to a pair of taps on the primary winding 62 of welding transformer 63. Winding 62, as shown, is provided with taps designated by characters 64 to 70, and by changing the setting of variable contacts 71 and 72, more or less current may be obtained in the secondary transformer winding 73 which is in direct electrical connection with welding electrodes 74.

The motor and commutator mechanism C comprises a synchronous motor 75 which drives, through suitable reduction gearing, the commutators 76 and 77 shown more clearly in Fig. 4 of the drawings. Commutator 76 will be seen to have a ring 78 with which a brush 79 makes continuous sliding contact. Spaced along ring 78 are points of electrical connection designated by characters 301 to 312 which are connected, respectively, to condensers, designated by characters 401 to 412 which in turn are connected, respectively, to commutator sectors 501 to 512. Since it is not practical to have the condensers 401 to 412 rotate with ring 78 and sectors 501 to 512, the condensers may be in a stationary bank as indicated in Fig. 2, and connection made with the respective sectors and points on ring 78 by means of rings and brushes.

In contact with sections 501 to 512 are the spaced brushes 601 to 612 which are mounted upon some kind of frame 80 which itself may be turned slightly in one or another angular direction to shift brushes 601 to 612 to a lagging or leading position. Mounted on frame 80 near brush 612 is a contact brush 613 which also makes contact with the sections. This brush is shorted through resistance 81, conductor 160 and brush 79 to ring 78. A stationary brush 82 is arranged to contact another ring 83 on commutator 76. Ring 83 is provided with spaced contact points 101 to 112 which are engaged by a brush 614. Engagement of brush 614 with points 101 to 112 takes place when brushes 601 to 612 begin to make contact with sections 501 to 512.

Commutators 76 and 77 rotate at the same speed and may be mounted about a single shaft. On commutator 77 is a ring 85 which is contacted by a stationary brush 86 and which is provided with contact points 201 to 212 spaced about its circumference. A contact brush 87 makes contact with these points as ring 85 rotates. Brush 87 is mounted on a frame 88 which may be moved angularly to shift brush 87 to a leading or lagging position.

A stationary brush 89 is in contact with another ring 90 on commutator 77. Ring 90 is provided with spaced contact points 221 to 232 which are engaged by a brush 91 mounted on a frame 88. Brush 91 is arranged to make contact with one of points 221 to 232 as brush 87 makes contact with one of points 201 to 212.

The means D, for initiating current flow in main control circuit B, will be described with reference to the direction of current flow and sequence of operation.

Referring now to Figs. 3, 6 and 9 of the drawings, posts 92 and 93 are seen to be connected with posts 28 and 27, respectively, of the power supply, post 93 being connected with the positive side. Conductor 94 connects post 93 with post 95a and conductor 95 connects post 95a with terminal 96 of spring contacts 97 associated with rotary cam switch 590. Terminal 96 is normally in contact with spring blade 98 which is connected through movable piece 99 of relay 450 (see Fig. 7) and conductor 100 to post 125. Conductor 126 leading from post 125 connects with condenser 127, and conductor 128 connects the other side of condenser 127 with terminal post 92. It can readily be seen that this circuit just described will operate to build up a charge in condenser 127.

The rotary cam switch 590 (see Fig. 9), referred to above, comprises a wheel 129 which may be driven through welding machine mechanism, and which is provided with spaced cams designated by characters 251 to 262. As wheel 129 rotates the cams engage blade 98 and momentarily cause blade 98 to break contact with terminal 96 and make contact with terminal 130. Wheel 129 is provided also with a second set of spaced cams designated by characters 271 to 282 which are arranged to engage spring blade 131 to make the contact 132. Cams 251 to 262 are arranged to engage blade 131 at a time after the engagement by cams 251 to 262 with blade 98.

Upon rotation of switch 590 and at the instant one of the cams operates to make contact between blade 98 and terminal 130, the charge which has been stored in condenser 127 is allowed to flow through conductors 126 and 100, through piece 99 of relay 450, and through conductor 133 to brush 87. Then when commutator 77 has rotated in a counterclockwise direction so as to bring brush 87 into contact with one of points 201 to 212, this charge from condenser 127 will flow through a section of ring 85 and will be picked up by brush 86. From brush 86 the charge may flow through conductor 134 to the plate 135 of rectifier tube 136. After passing from plate 135 to filament 137 of tube 136 it is conducted by wire 138 to the grid 139 of thermionic tube 140, the grid of tube 140 thus being given a positive potential. A condenser 141 and resistance 142 are connected in parallel between conductors 138 and 128 and serve as a grid leak for tube 140. Also condenser 141 receives a part of the charge which has passed from condenser 127 and maintains the grid of tube 140 in positive condition for a time after the contact between brush 87 and one of points 201 to 212 has been broken. It will be seen that the charge on condenser 141 cannot flow back over the same path because the rectifier tube 136 will not pass it in this direction.

Resistors 143 and 143A are connected in series across terminals 92 and 93 and serve as a voltage divider. A conductor 145 connects the filament 146 of tube 140 with point 147 between resistors 143 and 143A and which is negative with respect to terminal 93. The characteristics of tube 140 are such that it will pass plate current only when a positive potential is applied to its grid. So when the positive charge from condenser 127 is impressed upon grid 139 as just described, a current will flow through conductor 148, and through the selector system F which will be more fully described later, and to one of brushes 601 to 612, say for example brush 601. From the brush 601 current passes to sector 501 then just starting to make contact with this brush, and on to one side of condenser 401. On the other side of condenser 401 the circuit follows through ring 78, brush 79, and through conductor 149 to post 150. Post 150 is connected with one end of the primary winding 151 of transformer 152 the other end of winding 151 being connected to the plate 153 of tube 140. It can readily be seen that when the grid of tube 140 is positive current will pass from plate 153 to filament 146 and through the circuit just described until condenser 401 is fully charged.

Current through primary winding 151 of transformer 152 produces a high voltage surge across secondary winding 154 of this transformer, and winding 154 is connected through conductor 155 and resistance 156 to the grid 39 of tube 37, to impress a positive voltage on grid 39 of this tube. It is this voltage impressed on grid 39 which starts the flow of current in the main control circuit B. The resistance 156 is interposed merely for protecting tube 37 against excessive grid current.

The means E, for terminating the flow of current in the main control circuit B, includes a conductor 157 which connects brush 612 on commutator 76 with one side of resistor 158, in the grid circuit of tube 43. The other side of resistor 158, which is connected to grid 44 of tube 43, is connected by means of conductors 160 and 149 to brush 79 and ring 78. Thus it can be seen that when commutator 76 has rotated sufficiently to bring sector 501 into contact with brush 612 the condenser 401 will discharge, causing a current to flow through sector 501, brush 612, conductor 157 and resistor 158, and return by way of conductor 160 and 149 to brush 79 and ring 78. The voltage drop across resistor 158 causes a negative voltage to be impressed upon the grid 44 of tube 43. Since tube 43 will not pass plate current when its grid is negative, the current flowing in the main control circuit must instantly stop, and once this current is stopped it will not start again until a potential is again impressed upon the grid of tube 37 in the way previously described.

The selector system F includes a group of conductors designated by characters 701 to 711 each of which is connected at its one end with one of brushes 601 to 611, conductor 701 being connected with brush 601, conductor 702 with brush 602, etc. Each of conductors 701 to 711 is connected to one point on each of secondary switches 801 to 811, each of which has one central point connected to a movable indicator arm which may be turned into contact with either of points designated 0, 1, 2, 3, etc., to 11, and conductor 701 is connected to point 1 on each of these secondary switches, conductor 702 connected to point 2 of each switch, etc. The central points of secondary switches 801 to 811 are connected, respectively, to points 1 to 11 on a primary switch 570.

Primary switch 570 has its center arm mechanically connected in tandem with switches 560 and 580, and also with toothed gear 161 of a magnetic rotary switch 550. Switch 580 has 12 contact points each of which are connected to one of the stop indicating lamps designated by numerals 900 to 911. Conductors leading from the other sides of lamps 900 to 911 and from the center point of switch 580 connect, respectively, with posts 13 and 14 of the power supply.

Switch 570 has 12 contact points numbered from 0 to 11 which are connected with secondary switches 801 to 811 as before stated. Switch 560 also has 12 contact points numbered from 0 to 11, and of these points 1 to 11, inclusive, are connected together to one side of relay 162 of the magnetic relay switch 550.

Switch 550 may be of any well known make. As here shown, when an electrical impulse momentarily energizes relay 162, arm 163 is drawn to and away from the relay, causing hooked arm 164 to turn wheel 161 to an extent that switches 560, 570 and 580 are advanced one step.

One side of relay 162 is connected directly with terminal 24 of the power supply by conductor 165, and the other side of relay 162 is connected to terminal 25 of the power supply through either of several paths. One path is through conductor 166 to spring blade 131 and thence by way of conductor 167 to terminal 25. This circuit is completed every time one of cams 271 to 282 makes engagement with blade 131. Another path is from conductor 166 through conductor 168 to spring contacts 169 of the dial selector 170 and thence by way of conductor 171 to post 25. The dial selector 170 may be of any desired type adapted to momentarily close spring contacts 169 a desired number of times. Another path is through conductor 172 to one of the points on switch 560, from the center point of switch 560 through spring contacts 173 arranged to be broken when relay 162 becomes energized, and thence by conductor 174 to contact point 175 of relay 177. When relay 177 is energized connection is made to relay terminal 176 and to post 25 by way of conductor 171. Relay 177 may be energized by either of two paths: one path may be followed from post 24 of the power supply by way of conductor 178 to the winding of relay 177; and thence by conductor 179 to operator's spring contacts 180, and return to post 25 by way of conductor 171. Another path includes conductor 182 leading from relay 177 to spring contact 183, and return to post 25 by way of conductor 167. When either contacts 180 or 183 are made, one of the paths just described will be completed and magnetic step switch 550 will continue to operate until switches 560, 570 and 580 have their arms at points designated as 0.

Spring contact 183 forms a part of an auxiliary control means including spring contacts 184 which are connected in parallel with contacts 97 associated with rotary switch 590, and contacts 185 which are connected in parallel with contacts 132. Instead of using the rotary cam switch 590, the contacts 183, 184 and 185 may be placed within reach of a workman and the timing and spacing of the control signals be thus manually controlled.

The indicating means G comprises 5 tubes designated by characters 350 to 354 and shown more clearly in Fig. 11 of the drawings. These tubes may be of the cathode ray type as here shown, or may be any type of tube which will glow upon passage of plate current. Tubes 352 and 353 have their plates 327 and 328 connected through secondary winding 325 of transformer 326, the primary of which is connected across the alternating current supply line. Cathode 329 in tube 352, and cathode 330 in tube 353 are connected by conductor 331 to brush 89 on commutator 77. Brush 91 on commutator 77 is connected by conductor 332 to the mid point of winding 325 on transformer 326. Grids of these tubes are connected to winding 325 at suitable points. It will be seen that if brush 91 were maintained in contact with one of points 221 to 232, plate current would flow through one of tubes 352 and 353 during one half of the cycle. If at the instant brush 91 makes contact, the alternating current is reversing and has a zero value, neither of these tubes will glow. It is clear then that the polarity of the alternating current at the time brush 87 makes contact with points 201 to 212 is indicated by which of tubes 352 and 353 glow, and the amount of lag or lead indicated by the brightness or breadth of glow.

Tubes 350 and 351 are connected across winding 333 of transformer 326 by an arrangement similar to that of tubes 352 and 353. The cathodes of tubes 351 and 352 are connected by conductor 334 to brush 614, and brush 82 is connected through conductor 335 to the mid point of winding 333. In the same manner as described in connection with the operation of tubes 352 and 353, tubes 350 and 351 serve to indicate the polarity and phase of the alternating current at the time brushes 601 to 612 begin contact with sections 501 to 512. A comparison of tubes 352 and 353 with tubes 350 and 351 gives an indication of the distance one of sectors 501 to 512 has moved in contact with one of brushes 601 to 612 before a charge begins to build up in one of condensers 401 to 412.

Tube 354, of a type similar to tubes 350 to 353, has its plate and target connected to a part of resistance in voltage divider 52 by conductor 336. Its cathode 330A is connected by conductor 157A to the grid circuit of tube 43, and its grid connected by conductor 337 to the filament circuit of tube 43. Tube 354 will pass current only when current is passing through the main control circuit, and so its brightness or breadth of glow is a measure of the length of the signals being emitted.

The bridge control arrangement H, shown more clearly in Fig. 7, includes a relay 450 which when energized through its winding 451 operates to open the circuit through conductor 100 and prevent emission of any signals by the device. Winding 451 is connected in the plate circuit of tube 460 the potential for which is obtained by connection through conductors 452 and 453 connected to the ends of voltage divider 52. The secondary winding 454 and 455 of transformers 470 and 471 respectively are connected in opposing series in the grid circuit of tube 460; and resistance 456 in parallel with condenser 457, as well as resistance 458 in series with condenser 459, serves as a grid leak and automatic C bias respectively. Windings 472 and 473 of transformers 470 and 471 are arranged and have their outer ends connected respectively to posts 60 and 61 of welding switch 57 through conductors 60A and 61A. A conductor 474 leading from a point between windings 472 and 473 connects with variable arm 475 of a potentiometer 476, the ends of which are connected to the center points 66 and 67 on the primary of welding transformer 63 through conductors 66A and 67A.

Potentiometer 476 may be adjusted so that equal voltage will be impressed on the windings 472 and 473 of transformers 470 and 471. When this is done no voltage will be across opposite phase connected windings 454 and 455 of transformers 470 and 471, consequently tube 460 not having any grid bias the relay 450, will close, allowing the closing of circuits through conductor 100. But when the settings on the primary of welding transformer 63 are changed, this disturbs the balance of the bridge and a voltage is impressed on the grid of tube 460. This allows current to flow in the plate circuit of this tube and relay 450 operates to terminate emission of signals by the device.

Referring now to the assembly of apparatus shown in Figs. 1 and 2, the meter 525, and switches 526 and 527 are for testing purposes only and are merely for the convenience of the operator in testing various parts of the equipment used. Dial 528 is a control for potentiometer 476, dial 529 a control for potentiometer 34, and dials 530 are controls for potentiometer 51. The levers 531 and 532 are for the convenience of the operator in shifting commutators 76 and 77 to lagging or leading positions. As shown in Fig. 2 cables or conduit 533 may be used in connecting the equipment. Obviously, any suitable scheme for setting up and arranging the equipment may be employed.

While in the schematic diagram given the selector system F has been shown, for the sake of clearness, as having only one "channel", or one set of connections between secondary switches 801 to 811 and respective points on the primary switch 570, it may be seen that several sets of such connections may be provided. That is, in one set of connections secondary switch 801 may be connected to point 1 of the primary switch 570, switch 802 to point 2, switch 803 to point 3, etc.; and in another set of connections secondary switch 801 may be connected to point 3 of switch 570, switch 802 to point 7 of switch 570, and so forth in any desired order. Still other sets of connections may be provided having still other combinations. For the convenience of the operator in selecting the desired channel the channel switch 534 is provided as shown in Fig. 1.

*Operation*

The manner of operation of each of the individual parts of the device will be understood from the detailed description already given, and an explanation of the operation of the unified device will now be given from the standpoint of the control operator.

When the device is to be used in connection with a spot welding machine or any other machine where timed signals are desired in series, the rotary cam switch 590 is mechanically connected to the machine so that cams 251 to 262 open contacts 97 at the times in the rotation of the machine when signals are desired. In adjusting the device for use, the operator will start the synchronous motor and while watching tubes 350 to 353 adjust commutators 76 and 77 for lag or lead in order to obtain a signal which begins and ends at the desired point on the voltage wave.

Assuming that the operator desires the signal to begin and end on zero voltage, when the current is at the point of reversal, he may adjust commutator 77 until either of tubes 352 or 353 glow. When this point is reached, the operator knows that brush 87 is making contact at the very beginning of the cycle. The motor is so geared as to cause the commutators to rotate once in every 12 cycles, there being 12 brushes used in this embodiment.

Then the operator adjusts commutator 76 until there is no glow in either tube 350 or 351. When this point is reached, he knows that the signal will be started and stopped at the instant of zero voltage. If, subsequently, due to variation of line power factor or otherwise this adjustment becomes disturbed, the operator immediately recognizes it by the glow of the indicating tubes, and correction can be made.

Secondary switches 801 to 811 may be set at the length of signal and in the sequence desired. For example, if in a spot welding machine the produce is welded by a series of 11 welds and is thicker at its central portion, it may be preferred to set switches 801 and 811 on 1, and switch 806 on 6, so that the length of signal is greater nearer the center of the piece. Or, it may be that different types of pieces are being welded by the machine, in which case the operator may quickly change from one channel to another to give a series of times corresponding to the piece.

Lamps 900 to 911 indicate to the operator the point at which switch 570 is set, and any other desired setting may be obtained by operating dial selector 170. Or when the operator wishes the switch 570 returned to 0 setting (the idle point), he may press button 535 (see Fig. 1) to close contacts 183. This causes magnetic step switch 550 to operate until switches 560, 570, and 580 are each at the 0 point.

By using meter 525 the operator may adjust potentiometer 476 until no current flows through conductor 474 at which point the bridge circuit is balanced for the particular potentiometer setting then being used. Then should the operator of the welding machine or other appliance change the setting of the transformer, this would throw the bridge out of balance and no further signals would be given by the device.

When regular operation begins, and cam 251 engages blade 98, a charge is transmitted through tube 136 to the grid of tube 140 only after brush 87 contacts one of points 201 to 212 which, in the adjustment above indicated, takes place at the beginning of the cycle. This permits current to flow through the primary of transformer 152 and charge condenser 401 (assuming switch 570 is on point 1 and switch 801 is on point 1), for at this instant sector 501 is just beginning contact with brush 601. Current through the secondary of transformer 152 causes a potential on the grid of tube 37 which allows passage of current in the main control circuit B. The output of the control circuit then operates to actuate a welding switch 57 or other equipment as the case may be. This signal will not be disturbed when sector 501 has moved from contact with brush 601, because tube 37 will continue to pass current regardless of its grid potential.

However, when sector 501 has continued to rotate in the direction indicated by arrow 336 until it makes contact with brush 612 one cycle after its first contact with brush 601, the charge which condenser 401 has obtained will be transmitted to the grid of tube 43. This operates to immediately stop the flow of current through the main control circuit and consequently terminates the signal.

After sector 501 has turned still farther and makes contact with brush 613, all charge remaining in the condenser or on the grid of tube is drained.

Succeeding the signal, cam 271 of the rotary switch 590 engages blade 131 to operate step switch 550 which advances switches 560, 570, and 580 one point. Now lamp 902 lights and gives indication that the next impulse will be through switch 802. Then if switch 802 is set at 2, when the next contact is made by cam 252 of rotary switch 590 the same events will take place as before except that this time the condenser which happens to be adjacent brush 602 will be charged, and two cycles of time will elapse before this condenser reaches brush 612 and terminates the signal.

After every signal, the magnetic stop switch operates to advance switch 570, and before cam 262 makes contact with blade 98, switch 570 has been turned to 0, and before cam 251 again makes engagement, switch 570 has been again turned to 1. This series may then be repeated upon the second revolution of rotary cam switch 590.

When it is desired that the signal begin or end at times other than zero voltage, this may be accomplished by adjustment of commutators 76 and 77, reference being had to indicating lamps 550 to 553. The advantages of being able to select the points on the voltage wave at which the signal is made and broken are many. For example, in cutting off current through an inductance, such as the winding of a welding transformer, it is desirable to cut the current flow not at the point of zero voltage but at the point of unity power factor, since the current lags the voltage through an inductance. Such adjustment of control is especially valuable for eliminating undesirable transient effects.

While I have described in detail a specific embodiment of my invention, it is understood that many changes may be made in the arrangement and construction without departing from the spirit of my invention. For example, while I have shown commutators 76 and 77 as having 12 brushes and 12 segments, it is clear that these commutators may have any number of brushes and segments, the speed at which the commutators are driven by the synchronous motor being regulated accordingly. Other changes in detail may be made as desired.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. An electric timing device comprising a circuit adapted to have a current flow therein, valve means in said circuit normally blocking current flow therethrough, means for rendering said valve means ineffective to block said current flow after a predetermined instant, a second valve means in said circuit normally permitting current flow therethrough but capable of blocking said flow, and means for rendering said second means effective to block said flow after a predetermined interval.

2. An electric timing device comprising a circuit adapted to have a current flow therein, means in said circuit normally blocking current flow therethrough but ineffective to control said current flow after its initiation, means for rendering said blocking means ineffective at a predetermined instant, a second means in said circuit normally permitting current flow therethrough but capable of blocking said flow, and means for rendering said second means effective to block said flow after a predetermined interval.

3. An electric timing device comprising a circuit adapted to have a current flow therein, means in said circuit normally blocking current flow therethrough but ineffective to block said current flow after receiving an electric impulse, means for delivering an electrical impulse to said blocking means at a predetermined instant, a second means in said circuit normally permitting current flow therethrough but effective to block said flow upon receiving an electric impulse, and means for delivering an electrical impulse to said second means after a predetermined interval.

4. An electric timing system comprising a circuit adapted to have a current flow therein, a vapor electric device in said circuit and having a control grid, said device being effective normally to block current flow through said circuit but being ineffective to block said current flow after receiving a potential on its grid, means for delivering an electrical potential to the grid of said device at a predetermined instant, a thermionic device in said circuit normally permitting current flow therethrough, said thermionic device having a grid and being effective to block said flow upon receiving an electric potential on its grid, and means for delivering an electrical potential to the grid of said thermionic device after a predetermined interval.

5. An electric timing system comprising a circuit adapted to have a current flow therein, means for controlling the intermittent flow of current through said circuit, said means including an electronic valve device effective to block the flow of current through said circuit except after a potential is applied to its grid, said means including also a second electronic device connected in series with said first-mentioned device, said second device being effective to terminate the flow of current through said circuit when a potential is applied to its grid.

6. In an electric timing device, a circuit adapted to have a current flow therein, means in said circuit normally blocking current flow therethrough, a synchronous motor connected with a source of alternating current, and means for rendering said blocking means ineffective during more than one-half cycle of said alternating current and after an instant determined by the rotation of said motor.

7. An electric timing device comprising a circuit adapted to have current flow therein, means in said circuit normally blocking current flow therethrough, a synchronous motor, means for rendering said blocking means ineffective after an instant determined by the rotation of said motor, a second means in said circuit normally permitting current flow therethrough but capable of blocking said flow, and means for rendering said second means effective to block said flow after an interval determined by the rotation of said motor.

8. An electric timing system comprising a circuit adapted to have a current flow therein, a vapor electric device in said circuit, said device having a control grid and normally blocking current flow through said circuit but ineffective to block said current flow after receiving a potential on its grid, a synchronous motor, means for delivering an electric potential to the grid of said vapor electric device at an instant determined by the rotation of said motor, a thermionic device in said circuit, said thermionic device having a grid and normally permitting current flow through said circuit but effective to block said flow upon receiving an electric potential on its grid, and means for delivering an electric potential to the grid of said thermionic device after an interval determined by the rotation of said motor.

9. An electric timing device comprising a circuit adapted to have a current flow therein, a source of alternating current, and means for terminating the flow of current in said circuit at any predetermined point on the voltage wave of said alternating current.

10. An electric timing device comprising a circuit adapted to have a current flow therein, a source of alternating current, means for initiating the flow of current in said circuit at any predetermined point on the voltage wave of said alternating current, and means for terminating said flow at a predetermined interval after said initiation.

11. An electric timing device comprising a circuit adapted to have a current flow therein, electric valve means in said circuit normally blocking the flow of current therethrough, a source of alternating current, means for rendering said valve means ineffective for blocking said current flow at a predetermined point on the voltage wave of said alternating current to initiate a flow of current through said circuit, and a second means in said circuit normally permitting current flow therethrough but capable of blocking said flow, and means for rendering said second means effective to block said flow at a predetermined interval after its initiation.

12. An electric timing device comprising a circuit including a source of direct current, a source of alternating current, and means for controlling the intermittent flow of direct current though said circuit, said means being effective for initiating the flow of current at any predetermined point on the voltage wave of said alternating current.

13. An electric timing device comprising a circuit adapted to have a current flow therein and including a source of direct current, a source of alternating current, a synchronous motor, and means for initiating the flow of said direct current in said circuit at any point on the voltage wave of said alternating current, said means including a commutator driven by said synchronous motor.

14. An electric timing device comprising a circuit adapted to have a current flow therein and including a source of direct current, a second circuit controlling the flow of direct current in said first-mentioned circuit, said second circuit being ineffective to affect said first-mentioned circuit after said flow of direct current is initiated, said second circuit including means for passing said direct current therethrough only after receiving an electric impulse, and means for delivering an electric impulse to said first-mentioned means at a predetermined instant.

15. An electric timing device comprising a circuit adapted to have a current flow therein, a second circuit controlling the flow of current in said first-mentioned circuit, said second circuit being ineffective to affect said first-mentioned circuit after said flow of current is initiated, said second circuit including means for passing current therethrough only after receiving an electric impulse, and means for delivering an electric impulse to said first-mentioned means at a predetermined instant to initiate said current flow, means in said first-mentioned circuit normally permitting current flow therethrough but capable of blocking said flow upon receiving an electric impulse, and means for delivering an electric impulse to said last-mentioned means at a predetermined interval after said initiation of current flow in said first-mentioned circuit.

16. An electric timing device of the character set forth comprising: a circuit adapted to have a current flow therein; means for controlling the initiation of current flow through said circuit, said means including a secondary circuit having means therein for passing the flow of current only after receiving an electrical potential, a charged condenser, a synchronous motor, means for applying the charge on said condenser to said means in said secondary circuit at an instant determined by the rotation of said motor, space discharge means in said first-mentioned circuit normally permitting the flow of current therethrough but capable of blocking current flow upon receiving an electrical potential, and means for delivering a potential to said space discharge means after an interval measured by the rotation of said synchronous motor.

17. An electric timing device of the character set forth comprising: a circuit adapted to have a current flow therein, means for controlling the intermittent flow of current through said circuit, said means including a secondary circuit having therein a space discharge tube adapted to pass current flow only after receiving an electric potential, means for delivering an electric potential to said tube at a predetermined instant, a condenser, means for bringing said condenser into said secondary circuit to complete said secondary circuit and build a charge on said condenser, a space discharge tube in said first-mentioned circuit normally permitting the flow of current therethrough but adapted to terminate said flow upon receiving an electrical potential on its grid, and means for bringing said condenser into electrical connection with the grid of said last-mentioned tube.

18. A device as set forth in claim 17 and including a synchronous motor, and means for bringing said condenser into connection with the grid of said last-mentioned tube after an interval measured by the rotation of said motor.

19. An electric timing device comprising a circuit adapted to have a current flow therein, a source of alternating current, means for initiating the flow of current in said circuit at any predetermined point on the voltage wave of said alternating current, and tube means for visibly indicating the point on said voltage wave at which said current flow is being initiated.

20. An electric timing device of the character set forth comprising a main control circuit adapted to have a current flow therethrough, a secondary circuit for initiating current flow in said main control circuit, a tube in said secondary circuit for passing current therethrough only when a potential is received on its grid, an alternating current source, a synchronous motor connected with said source, means for delivering a potential to the grid of said tube at intervals determined by the rotation of said motor, and indicating means for showing the point on the voltage wave of said alternating current at which said potential is delivered.

21. An electric timing device of the character set forth comprising a circuit adapted to have a current flow therein, a source of alternating current, means for terminating the flow of current in said circuit at any predetermined point on the voltage wave of said alternating current, and means for visibly indicating the point on said voltage wave at which said current flow is terminated.

22. An electric timing device of the character set forth comprising a circuit adapted to have a current flow therein, control means for regulating the periods and intervals of current flow in said circuit, a source of alternating current, and means for visibly indicating the voltage polarity of said alternating current source at the instants said current flow is initiated and terminated.

23. In an electric timing device adapted to emit a series of current impulses, a synchronous motor, and means for regulating the length of each of said impulses according to the angular rotation of said motor.

24. In an electric timing device adapted to emit a series of current impulses, a synchronous motor, and means for regulating the length of each of said signals according to the angular rotation of said motor, said means being effective to regulate the length of each of said impulses independently of the others.

25. In an electric timing device adapted to emit a series of current impulses, a synchronous motor, a commutator driven by said motor, a circuit controlling the initiation of said impulses, means for completing said circuit at a predetermined angular position of said commutator to initiate one impulse of said series, and means for completing said circuit at another angular position of said commutator to initiate another impulse of said series.

26. In an electric timing device of the character set forth adapted to emit a series of current impulses, a synchronous motor, a commutator driven by said motor, a circuit controlling the initiation of said impulses, means for completing said circuit at predetermined angular positions of said commutator to initiate each of said impulses, a circuit controlling the termination of each of said impulses, and means for completing said last-mentioned circuit at predetermined angular positions of said commutator.

27. In an electric timing device adapted to emit a series of electric impulses, a synchronous motor, a circuit controlling the initiation of said impulses, means for completing said circuit at different angular positions of said motor, a switch in said circuit for determining the angular position of said motor at which said circuit is completed, and means for advancing said switch during the interval between impulses.

28. In an electric timing device adapted to emit a series of electric impulses, a synchronous motor, a commutator driven by said motor, a circuit controlling the initiation of said impulses, a switch in said circuit and having its contact points connected to secondary switches, said secondary switches having their contact points connected to spaced points about said commutator, and means for advancing said first-mentioned switch between each of said impulses.

29. In an electric timing device adapted to emit a series of electric impulses, a synchronous motor, a circuit controlling the initiation of said impulses, a circuit controlling the termination of said impulses, means for completing said first-mentioned circuit at one angular position of said motor and for completing said last-mentioned circuit after an interval determined by the rotation of said motor, means for completing said first-mentioned circuit at another angular position of said motor and for completing said last-mentioned circuit after a different interval determined by the rotation of said motor, and switch means for automatically connecting said first-mentioned means in said first-mentioned circuit during one impulse of said series and connecting said last-mentioned means in said first-mentioned circuit during another impulse of said series.

30. An electric timing device comprising a circuit adapted to have a current flow therein, a source of alternating current, a synchronous motor connected to said source, means for initiating a series of currents in said circuit at any predetermined point on the wave of said alternating current, means for terminating one of said currents in said series after an interval measured by the angular rotation of said synchronous motor, and means for terminating another of said currents in said series after a different interval measured by the angular rotation of said synchronous motor.

31. In an electric timing device adapted to emit a series of electric impulses, a synchronous motor, means for controlling independently the length of each of said impulses in said series according to the angular movement of said motor, said means including a switch and means for advancing said switch during intervals between impulses.

32. A device as set forth in claim 31 and including a magnetic step switch for advancing said first-mentioned switch, and means for connecting said step switch for continuous operation until said first mentioned switch is advanced to a predetermined position.

33. An electric timing system of the character set forth comprising a circuit having its output connected to a control device, said control device having one set of terminals connected to a current supply line and another set to the primary of a transformer, an electronic device in said circuit normally blocking the flow of current therethrough but adapted to pass said current flow upon receiving an electrical potential, means for delivering electrical potentials to said electronic device at predetermined instants, and means for rendering said last-mentioned means ineffective when the number of turns included in said transformer primary winding is altered.

34. An electric timing system of the character set forth comprising a control device, said device controlling the intermittent passage of current through an impedance, means for delivering current impulses to said switch, said impulses being of predetermined lengths and at predetermined intervals, a bridge circuit including in one leg thereof a fixed part of said impedance, said bridge circuit being balanced but adapted to become unbalanced upon change in the value of said impedance, and means for rendering said means for delivering impulses ineffective upon an unbalanced condition of said bridge.

35. Apparatus as set forth in claim 34 in which said last-mentioned means includes an electronic device arranged to pass current only when said bridge is in unbalanced condition, and a relay for rendering said means for delivering current impulses ineffective upon passage of current through said device.

36. An electric timing system of the character set forth comprising a power circuit having a source of alternating current voltage, a control circuit controlling the flow of current in said power circuit, an electric valve in said control circuit for controlling the flow of current therein, means controlling the operation of said electric valve and including an electronic device equipped with a grid and adapted to pass an electric current upon receiving a charge upon said grid, an original circuit having a source of direct current supply therein and containing a charged condenser, and means for applying the charge on said condenser to the grid of said electronic device at a predetermined instant.

37. A system as set forth in claim 36 in which said last mentioned means includes a synchronous motor and a commutator driven by said motor.

JOHN J. ROOT.

DISCLAIMER 2,144,033.—*John J. Root*, South Bend, Ind. ELECTRICAL TIMING CONTROL. Patent dated January 17, 1939. Disclaimer filed September 24, 1942, by the assignee, *Bendix Products Corporation*.

Hereby enters this disclaimer to claims 10 and 23 of said patent.

[*Official Gazette October 20, 1942.*]